(12) United States Patent
Shapir

(10) Patent No.: US 8,886,027 B1
(45) Date of Patent: Nov. 11, 2014

(54) PHOTOGRAPHIC APPARATUS AND METHOD

(76) Inventor: Yishai Shapir, Edgewater, NJ (US)

(*) Notice: Subject to any disclaimer, the term of this patent is extended or adjusted under 35 U.S.C. 154(b) by 337 days.

(21) Appl. No.: 13/158,403

(22) Filed: Jun. 11, 2011

Related U.S. Application Data

(60) Provisional application No. 61/354,901, filed on Jun. 15, 2010.

(51) Int. Cl.
*G03B 15/05* (2006.01)

(52) U.S. Cl.
USPC .......................................... 396/174; 396/198

(58) Field of Classification Search
USPC .................................................. 396/174, 198
See application file for complete search history.

(56) References Cited

U.S. PATENT DOCUMENTS

| | | | | |
|---|---|---|---|---|
| 3,162,111 A | * | 12/1964 | Koppen et al. | 396/68 |
| 4,129,898 A | * | 12/1978 | Ohrstedt | 362/7 |
| 4,514,794 A | * | 4/1985 | Haberthur-Heilig | 362/439 |
| 4,978,986 A | * | 12/1990 | Hatch | 396/544 |
| 5,311,409 A | * | 5/1994 | King | 362/17 |
| 7,380,966 B2 | | 6/2008 | Fong | |
| D578,151 S | | 10/2008 | Fong | |
| D588,182 S | | 3/2009 | Fong | |
| D591,323 S | | 4/2009 | Fong | |
| D591,785 S | | 5/2009 | Fong | |
| D594,893 S | | 6/2009 | Fong | |
| D607,915 S | | 1/2010 | Fong | |
| 7,748,858 B2 | | 7/2010 | Fong | |
| 7,748,875 B2 | | 7/2010 | Fong | |
| D623,681 S | | 9/2010 | Fong | |
| 7,946,719 B2 | | 5/2011 | Fong | |
| 7,978,971 B1 | * | 7/2011 | Honl | 396/198 |
| 2006/0109641 A1 | | 5/2006 | Fong | |
| 2007/0041722 A1 | | 2/2007 | Fong | |
| 2007/0286856 A1 | | 12/2007 | Brown | |
| 2008/0204883 A1 | | 8/2008 | Fong | |
| 2008/0259588 A1 | | 10/2008 | Fong | |
| 2009/0129046 A1 | | 5/2009 | Fong | |
| 2009/0154135 A1 | | 6/2009 | Fong | |
| 2010/0118552 A1 | | 5/2010 | Fong | |
| 2010/0150543 A1 | | 6/2010 | Fong | |

OTHER PUBLICATIONS

"Flashright Product Description", 1-4, Jun. 9, 2011.
"Ultimate Bounce Card 2.0 Flash Diffuser", 1-6, Jun. 9, 2011.
"LumiQuest Products", *LumiQuest Photographic Accessories Product Guide*, 1-2, Jun. 9, 2011.
"Demb Flash Diffuser ProPrint Article Review", *Pinoy Photography*, 1-17, Jun. 22, 2007.
"gotlux? One Ounce Bounce Card/Diffuser for External Camera Flash Units (Black, 5 Inch)", *Amazon search results*, 1-5, Jun. 9, 2011.
"PRESSlite Flash Diffuser & Flash Bouncer", 1-2, Jun. 9, 2011.

\* cited by examiner

*Primary Examiner* — Clayton E LaBalle
*Assistant Examiner* — Dennis Hancock
(74) *Attorney, Agent, or Firm* — Gordon Kessler

(57) ABSTRACT

A photographic flash attachment apparatus. The apparatus includes a sleeve configured to be fixed to a photographic flash, a ring configured to engage with the sleeve, and one or more attachment mechanisms coupled with the ring adapted to receive one or more photographic attachment elements. Upon attachment of one or more photographic attachment elements to the ring via the one or more attachment mechanisms, rotation of the ring provides rotation of the one or more photographic attachment elements relative to the photographic flash.

14 Claims, 13 Drawing Sheets

PHOTOGRAPHIC APPARATUS AND METHOD

CROSS REFERENCE TO RELATED APPLICATION

This application claims the benefit of U.S. Provisional Patent Application Ser. No. 61/354,901 to Shapir, filed Jun. 15, 2010, titled "Photographic Apparatus and Method", the entire contents thereof being incorporated herein by reference.

FIELD OF THE INVENTION

This invention relates generally to aids for taking photographs, and more particularly to a method and apparatus for assisting in directing light from a flash when taking pictures.

BACKGROUND OF THE INVENTION

Currently available lighting techniques are designed to address a variety of problems yet still exhibit a number of deficiencies. Prior examples of photographic light diffusers and deflectors may be seen in U.S. Pat. Nos. 5,311,409, 5,839,006, and 7,380,966, each of which is incorporated herein by reference in their entirety.

Diffuse lighting accessories are photography devices commonly used to provide soft lighting effects in photographs. To achieve a diffuse lighting effect, light can be either directly or indirectly passed through a semi-transparent material, or it may be reflected off a material which will cause it to scatter somewhat. Such diffuse lighting is commonly produced by light sources which are remote from the camera. Typically, such light diffusers are provided by stationary screens, umbrellas, soft boxes and the like. Such devices provide excellent lighting effects in fixed studio settings where there is no need to transport the lighting equipment including the diffusers from place to place.

Each particular shot to be lighted dictates the type and intensity of light needed to properly illuminate the subject. In some situations direct light from a light source without any alteration may be required. In other situations direct lighting may be too strong or cast overly distinct shadows, in which case a more diffuse light is desirable. In still other cases, an even more indirect diffuse light may be needed to create the proper lighting effect. It is important to have a certain amount of uniformity in the lighting used to illuminate the subject. This uniformity may be achieved using typical stationary diffusers provided that the equipment is of good quality and is employed in the proper fashion.

A photojournalist or event photographer may be required to generate images under potentially very difficult lighting conditions, requirements and time constraints. Often, moving subjects may offer additional complications, such as when a celebrity or other person shakes a hand and moves along, potentially continuously or intermittently.

Furthermore, existing on-camera flash units offer a very small and portable light source, but potentially generate extremely harsh lighting, thereby resulting in potentially unflattering pictures. Photographers have tried to resolve this issue by softening the small light source in any number of manners, such as wi8th reflectors or diffusers. However, the problem of such a small light source offering a harsh, flat appearance still remains.

While the equipment described above provides good lighting effects in a fixed studio setting, it can be inconvenient if not impossible to use such stationary lighting accessories outside of the photography studio. For shoots which require the photographer to be mobile, especially shoots where the photographer must capture action shots or cannot otherwise pose his subject, a small portable diffuser may be used which attaches directly to the camera itself. Such a light diffuser may be placed directly over an on-camera flash to provide a semi-transparent barrier to clear light transmission. Known diffusers exist which are small and portable with the camera and flash itself, and these diffusers are used by photographers in shoots where it is impractical to employ fixed lighting equipment. However, known portable diffusers for use with on-camera flashes are less than ideal in terms of the quality of lighting produced. These diffusers tend to create hotspots and may also leave noticeable, undesirable shadows. Furthermore, such diffusers do not allow for light to be directed in one or another desired direction from such a portable light source.

Existing flashcard attachments, such as reflectors or bounce cards which are stationary on the flash, may hinder the photographer from creating different quality directional lighting. The appearance of lighting on the subject of a photograph is relatively fixed to a single presentation based upon the method and direction of connection of such reflector or bounce card. Thus, the photographer is generally unable to modify a lighting presentation without a potentially lengthy and time consuming sequence of events.

Therefore, it would be desirable to provide a method and apparatus that overcome the drawbacks of the prior art.

SUMMARY OF THE INVENTION

In accordance with one or more embodiments of the present invention, the photographer artist is able to control, redirect and bounce light from a portable flash unit, thus changing the lighting direction, projection and quality of light very quickly and effortlessly while providing unlimited flexibility with one or more various attachments to the flash.

Therefore, in accordance with embodiments of the present invention, an improved flash adapter is provided that allows for a complete 360 degrees in rotation for the movement of any attached diffuser, reflector, bounce card or the like relative to the portable flash, in addition to any flash head rotation, resulting in greater flexibility to control and redirect light quickly. As will be described in greater detail below, various embodiments of the present invention allow the user to control the light by allowing for direction of light in 360 degrees around a portable flash head with only slight wrist action, similar to that employed for rotating a lens for zooming or focusing, with photographers already being accustomed to such adjustments.

In addition to flexibility provided for reflector and bounce cards, other accessory attachments may also benefit from various embodiments of the present invention, such as attachments that may be employed in accordance with the shooting of both video and still pictures substantially simultaneously. Therefore, in accordance with various embodiments of the present invention, one may attach a video light, boom microphone or the like, and control their respective angles in accordance with various embodiments of the apparatus and method of the present invention.

Furthermore, a photojournalist or event photographer that may be under time constraints when dealing with potentially difficult lighting circumstances will have the extra flexibility to properly, quickly and easily light their subjects, without wasting critical moments or loosing potential images.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The invention will now be described making reference to the following drawings in which like reference numbers denote like structure or steps. The subject improved photographic apparatus is preferably comprised of several cooperating elements as detailed below and shown in the accompanying figures.

Figure 11:
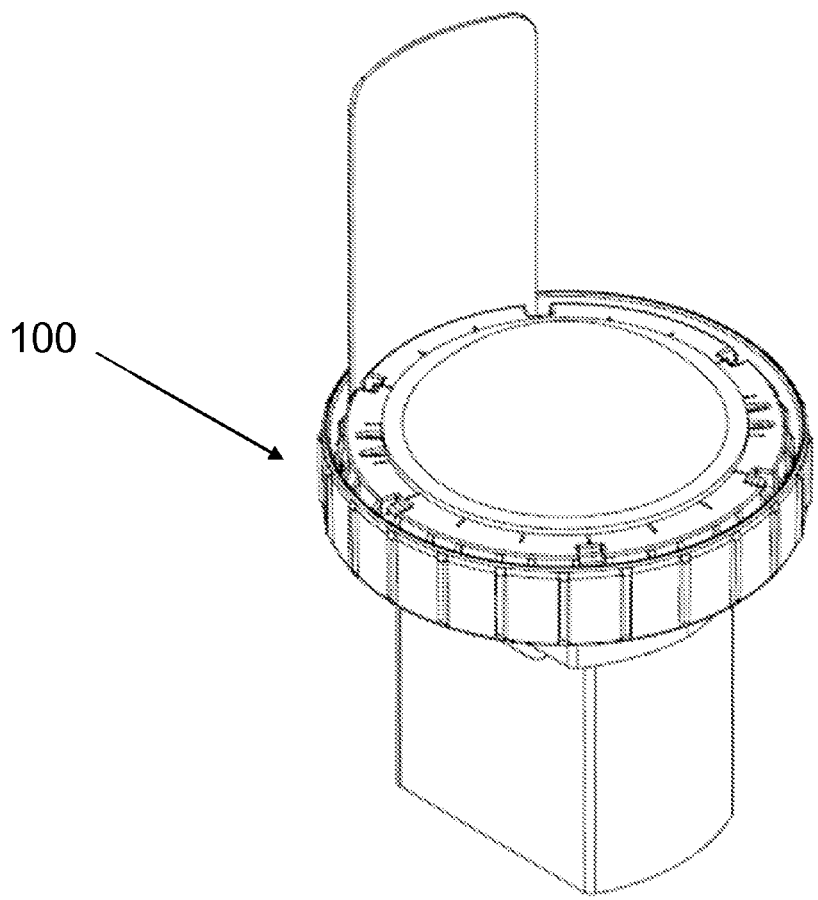
FIG. 11 is a perspective view of a light director constructed in accordance with another embodiment of the present invention.
Figure 12:
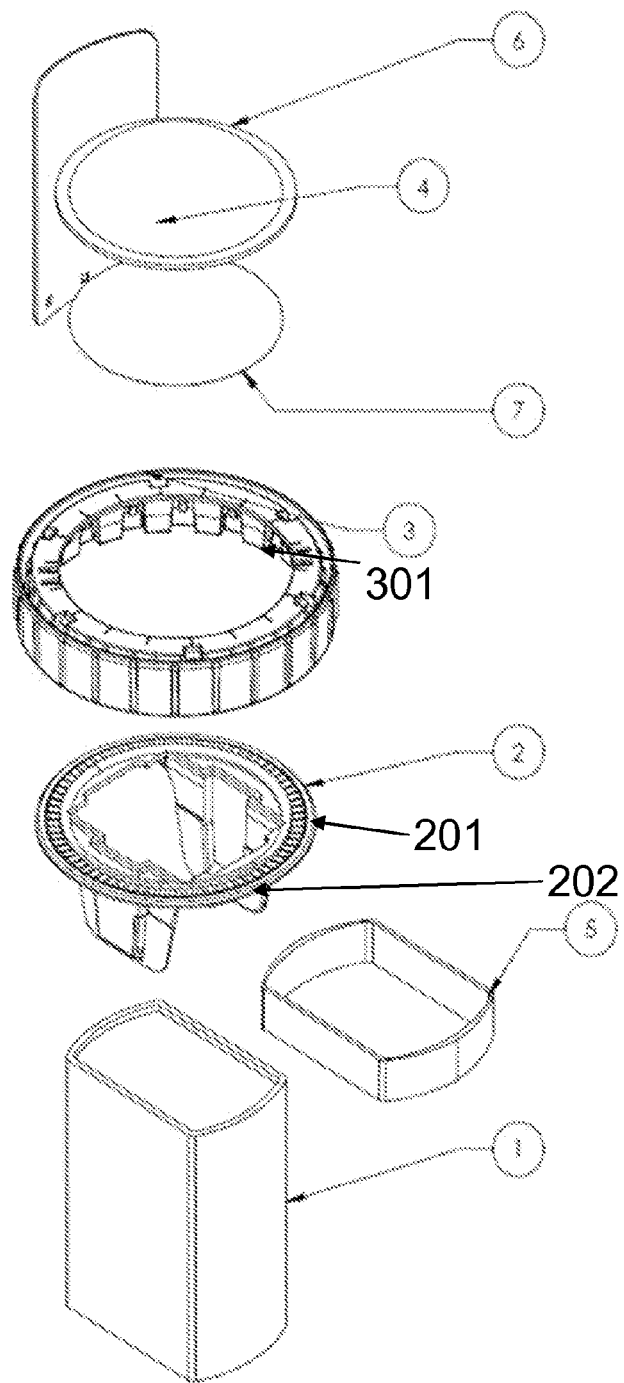
FIG. 12 is an exploded view of the light director of FIG. 11.

Referring first to FIGS. 11 and 12, a first preferred embodiment of an apparatus 100 is shown attached to a compact, conventional flash unit 1 (see FIG. 12). Various embodiments are preferably comprised of several cooperating elements which are adapted to engage and operate in the following manner. A first part of apparatus 100 may comprise a round or oval sleeve 2 defining a generally centrally located inner opening configured to compliment the shape of a particular conventional photographic flash unit 1, as shown in FIG. 12.

Thus, in accordance with various embodiments of the invention, sleeve 2 is dimensioned to be coupled with flash unit 1. A fastening strap 5 may alternatively be employed to further aid in fixing sleeve 2 to flash 1. Fastening strap 5 may be formed of elastic, or other material appropriate to put pressure on sleeve 2 to maintain contact between sleeve 2 and flash 1. Thus, after attachment of sleeve 2 to flash 1, with or without the user of fastening strap 5, it is anticipated that virtually no movement shall take place between sleeve 2 and flash 1. Of course, a differently-dimensioned sleeve 2 may be provided for each differently-dimensioned flash unit 5, or one or more sleeves may be formed with an adjustable size to accommodate two or more of such flashes.

Sleeve 2 is preferably configured to slide over flash unit 5, while a portion thereof may be positioned substantially adjacent the top of the flash. This portion of the sleeve is preferably formed as a flat portion, and may contain one or more points of attachment. In one preferred embodiment of the present invention, these attachment points may comprise one or more Velcro® hook and loop type fasteners, and may be employed to attach various photographic gels or other items. Of course, other fasteners such as clips, brackets and the like may alternatively be employed. As shown in FIG. 12, sleeve 2 may be formed with a lip 201 around at least a portion of its outer, bottom edge to support any additional add-on pieces, and to keep them from sliding out of position. Furthermore, one or more tooth mechanisms 202 may further be provided to allow for rotation of an add-on piece relative to sleeve 2.

A second element ring 3 may be formed as a round, oval, or other appropriately shaped part designed to complement first sleeve 2, and adapted to slide thereover. The exterior top of ring 3 may be formed with one or more fasteners, such as one of the fasteners noted above. Additionally, ring 3 may be formed with one or more ratchet elements 301 adapted to mesh with toot mechanisms 202. When combined, these complimenting elements allow for rotational movement of ring 3 relative to sleeve 2, but also provide indexed positioning, and resistance against unintentional movement. A portion of ring 3 may also be dimensioned to engage with lip 201 of sleeve 2, thus preventing accidental removal of ring 3. Ring 3 may be formed with a rubber, textured, or otherwise easily gripped surface. The rubber or textured surface preferably allows for traction for the user's fingers or hand to easily spin or rotate ring 3 360 degrees for easy positioning of an attached reflector, gel, or other photographic accessory (as will be described below).

Ring 3 may further be formed with one or more attachment fasteners or other items to allow for the attachment of accessories, such as a stick surface, pins and the like. As is shown in FIG. 12, four accessories may preferably be attached to ring 3, a bounce card 4, a dome 6, a gel filter 7, and a gird (not shown). Each will now be described in greater detail. Bounce card 4 may be provided with one or more holes or other fastening device therein for mating with corresponding elements on ring 3 or maintaining the position thereof relative to ring 3. Such a bounce card may be of any desired size. Once installed and fixed to ring 3, repositioning of the bounce card may be achieved simply by rotating ring 3 relative to sleeve 2 employing the ratcheting system described above. This, a user may easily reposition such a bounce card, thus redirecting light as desired, without the need for removing and reattaching such a card. A simple positioning of ring 3 relative to sleeve 2 is possible. Ring 3 may be provided with one or more position indicators or other scale thereon to allow for an indication of position, and to allow for repeatability and precision of positioning. Thus use of such a bounce card may allow light from the flash to be effectively bouncing from a bigger light source, yet having a softer feel to it. The movement of bounce card 4, especially to a position substantially blocking direct light from the flash reaching a subject may be desirable so as to provide diffused light in a portable setting, in a simple and easy manner. By so positioning the bounce card in between the subject and flash, only indirect light from the flash bouncing from outer surfaces in the room will reach the subject, thus providing a much softer light. By providing the ability to rotate the bounce card, for example, to block direct light or otherwise direct the light, the user may be able to "feather" the light to generate various desirable lighting characteristics. Thus, in accordance with various embodiments of the invention, the user is provided with before impossible ability to direct and isolate light as desired.

Dome 6 may be formed of a clear or diffusing material and preferably is attachable to a surface of ring 3. Dome 6 may be formed with one or more slits or other holes therein to provide one or more desired light patterns. Dome 6 may be further provided with a portion thereof formed of an opaque material, and the remainder of a diffusing or clear material. Positioning of dome 6 may take place similarly to the positioning noted above with respect to bounce card 4, and dome 6 may be rotated with bounce card 4, independently of bounce card 4, or remain in a fixed position while bounce card 4 is rotated. Dome 6 may therefore be provided and used along with bounce card 4, thus allowing for proper positioning and directing of the light, as noted. When used with a dome including an opaque portion, it may be preferable to have this opaque section directed to a photographic subject so that there is no direct, harsh light on, for example, the face of a subject. Light will be directed from the back, non-opaque portion of the dome, to the bounce card and indirectly to the subject. Gel 7 or a grid attachment for further directing light may be attached and positioned similarly, and may also be employed alone or in combination with bounce card 4 in one or more manners as described above. Therefore, as is shown in the embodiments as set forth in FIGS. 11 and 12, a convenient method for attaching one or more flash accessories is provided. Rotational movement of these accessories relative to a fixed position compact or other flash unit is provided in an each, compact and cost effective manner.

Figure 1:
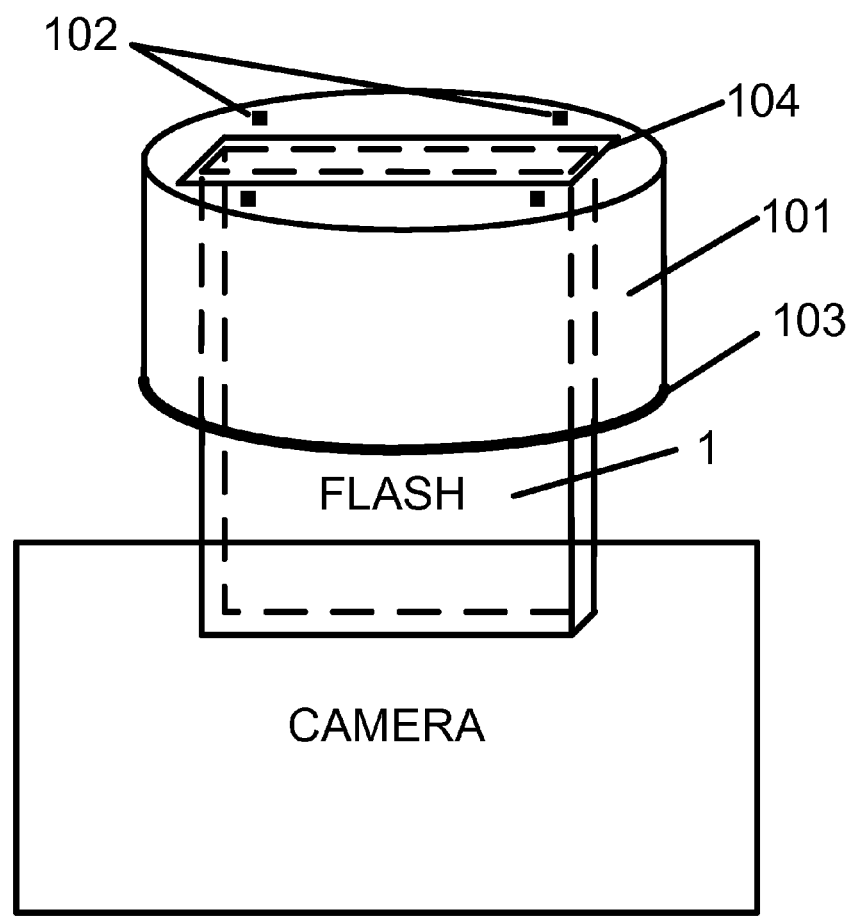
FIG. 1 is a perspective view of a first embodiment of the subject photographic lighting apparatus including a sleeve in combination with a camera.
Figure 2:
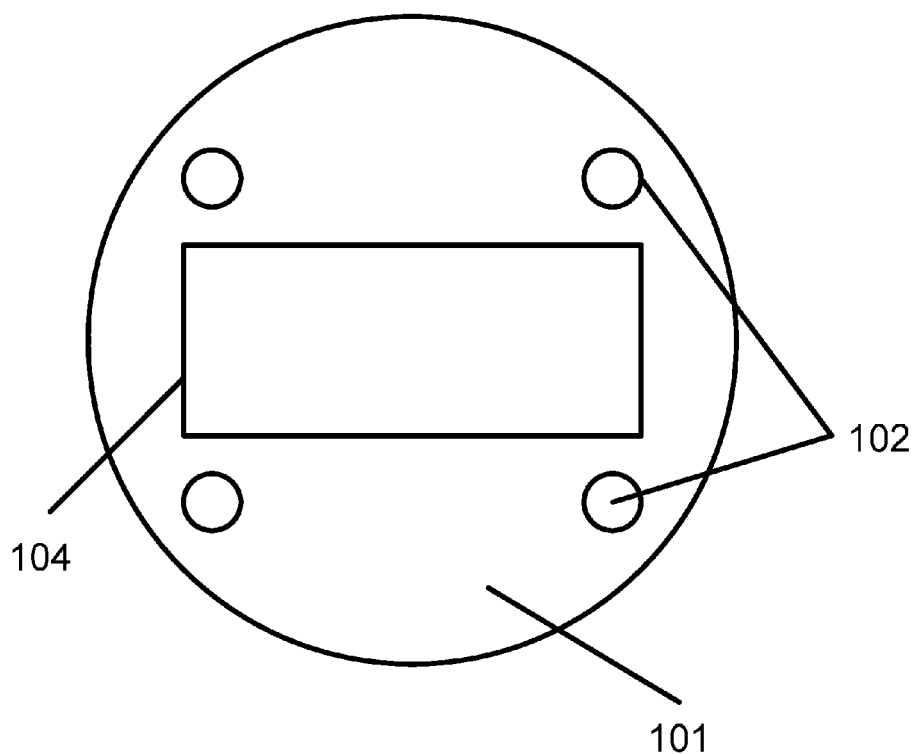
FIG. 2 is a plan view of the photographic lighting apparatus in accordance with the first embodiment of FIG. 1.

Referring next to FIGS. 1 and 2, an alternative embodiment of the invention is shown. An alternative attachment mechanism for a sleeve 101 is shown, and indeed, sleeve 101 is press fit or otherwise attached to flash 5. Attachment points 102 may be provided for fixing one or more attachment items to sleeve 101. Once attached, sleeve 101 may function similarly to sleeve 1 as described above. A lip 103 is shown positioned at a lower edge of sleeve 101, but may be positioned along sleeve 101 in any appropriate location to mate with corresponding structure on a ring. Sleeve 101 further defines an aperture 104 allowing for the light emitted from flash 5 to pass therethrough. Sleeve 101 is preferably formed of a white plastic to allow for reflection of light, but may be formed of any color or material as is appropriate.

Figure 3:
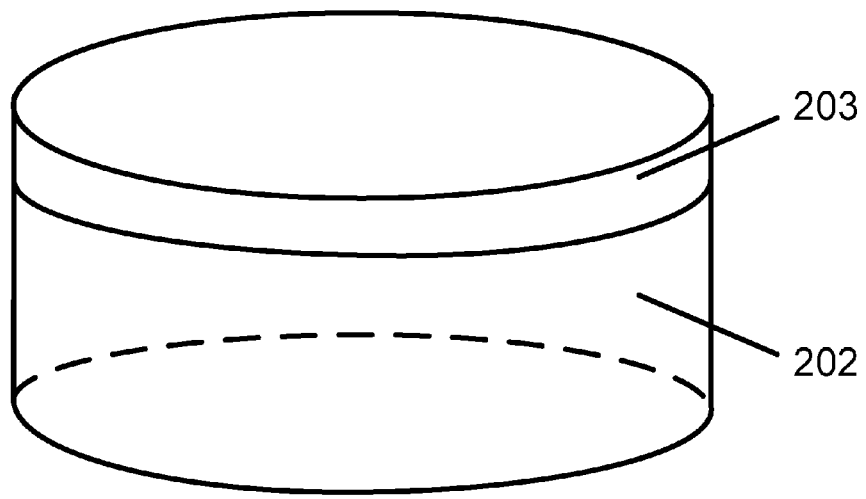
FIG. 3 is a perspective view of a ring adapted for use in an alternative embodiment of the subject apparatus and in combination with the sleeve of FIG. 1.
Figure 4:
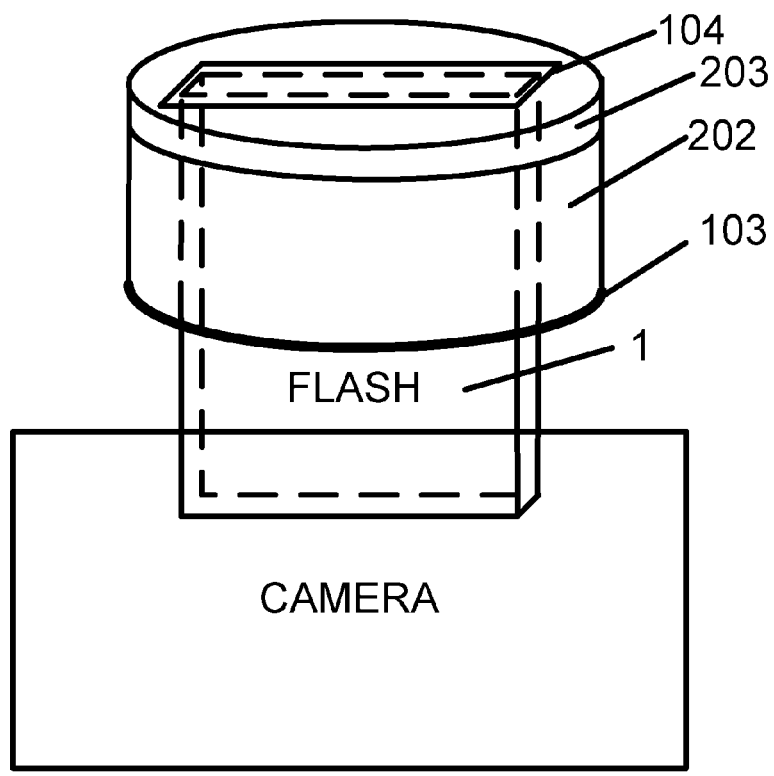
FIG. 4 is a perspective view of the ring of FIG. 3, and further combined with the apparatus shown in FIG. 1.

FIGS. 3 and 4 depict a ring 202 that is dimensioned to couple with sleeve 101, and thus provide relative rotation thereto. As is shown in FIG. 3, ring 202 may be provided with one or more attachment mechanisms 203 thereabout, for attachment of various other elements, such as those described above. In FIG. 3, such an attachment mechanism may comprise a Velcro® hook and loop type fastener, a fastener such as that shown in FIGS. 11 and 12, or any other appropriate fastener. As is shown in FIG. 4, ring 102 preferably sits on, or otherwise engages with, lip 103 of sleeve 101 so that ring 202 is supported thereby. Alternative attachment mechanisms such as the attachment scheme shown in FIGS. 11 and 12. Ring 202 may be formed of a rubber or other high friction material designed to provide grip for a user.

Figure 5:
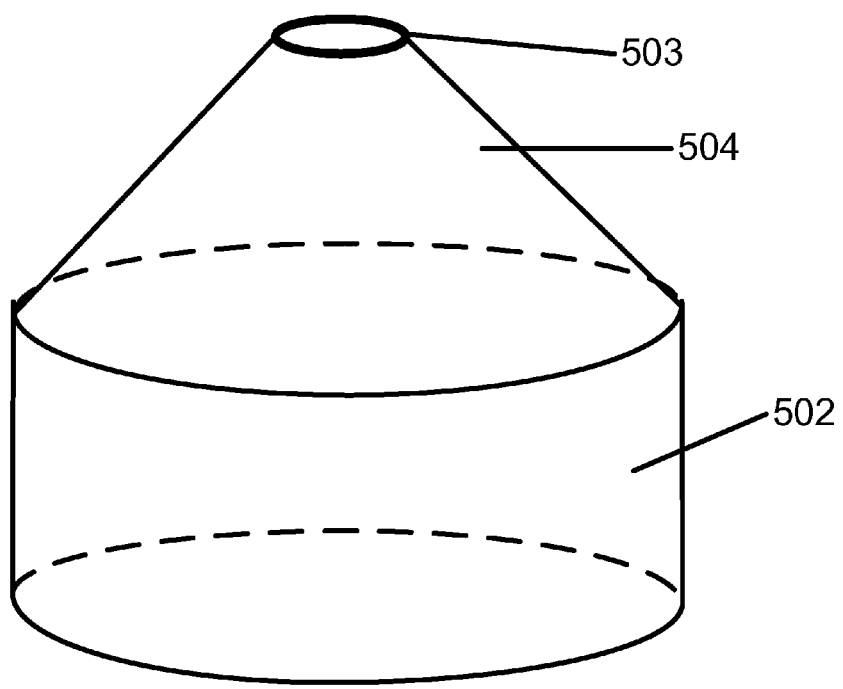
FIG. 5 is a perspective view of a cone diffuser which may be utilized with the subject apparatus in accordance with yet another embodiment of the present invention.
Figure 6:
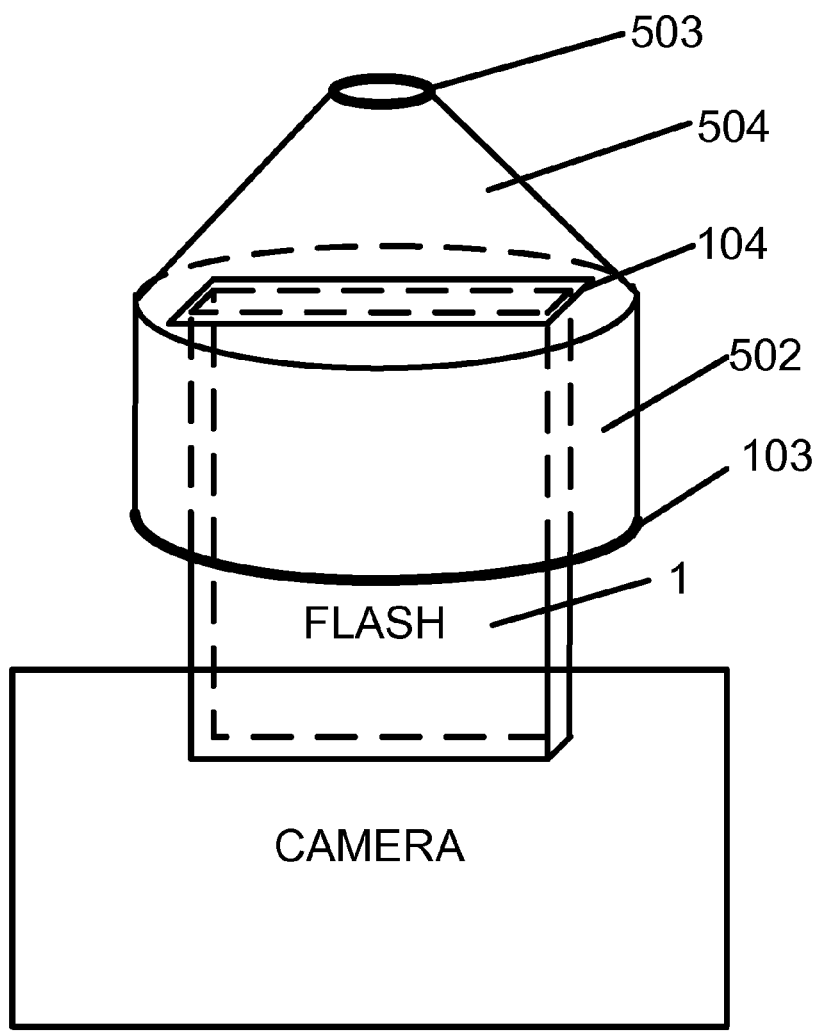
FIG. 6 is a perspective view of the cone diffuser of FIG. 5 in combination with the apparatus of FIG. 1.
Figure 7:
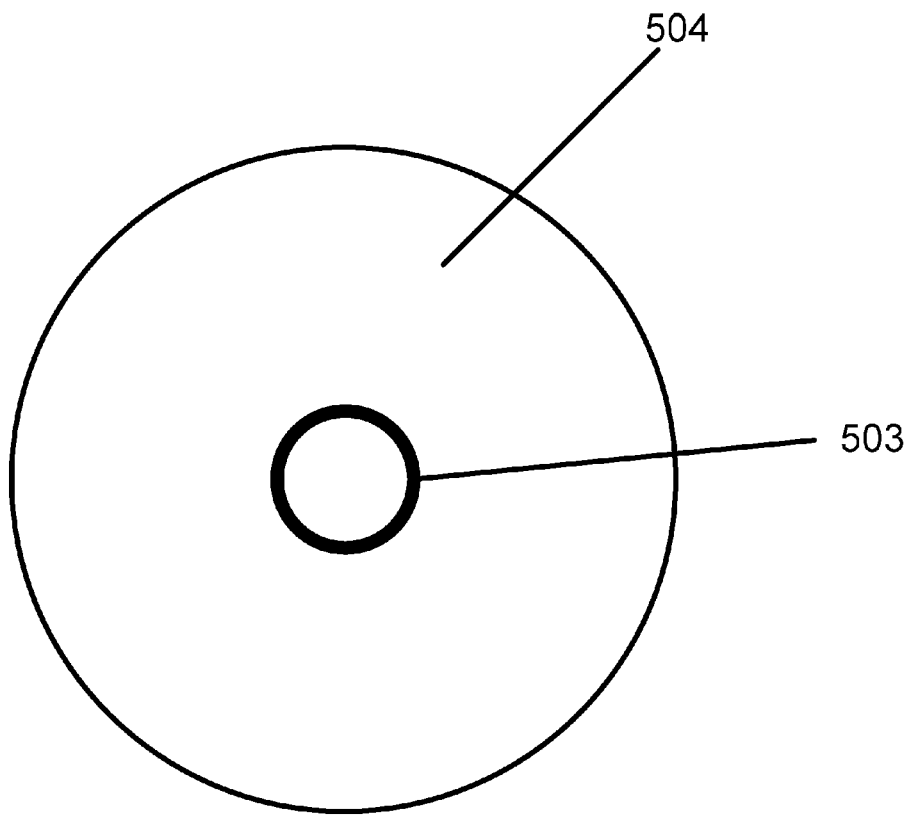
FIG. 7 is a top plan view of the diffuser device of FIG. 5.
Figure 13:
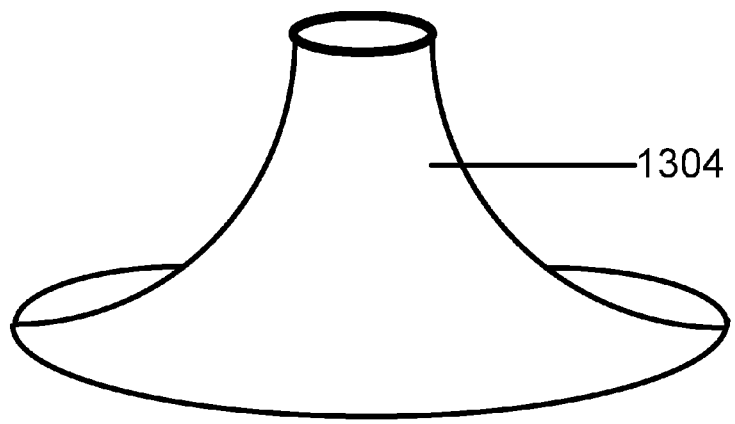
FIG. 13 is an alternative embodiment of a top ring portion in accordance with an embodiment of the invention.

Referring next to FIGS. 5, 6 and 7, an alternative ring 502 is shown with a conical top portion 504, and includes a threaded portion 503 for receiving one or more attachments fixed directly thereto. Ring 502 is dimensioned to slide over and otherwise engage with sleeve 101, and may similarly be dimensioned to engage with ring 2 of the prior embodiments as set forth in FIGS. 11 and 12. Such a conical section ring may be employed in accordance with the embodiments of FIGS. 11 and 12. Furthermore, the conical top portion may be formed with curved sides, such as top portion 1304 shown in FIG. 13.

Figure 8:
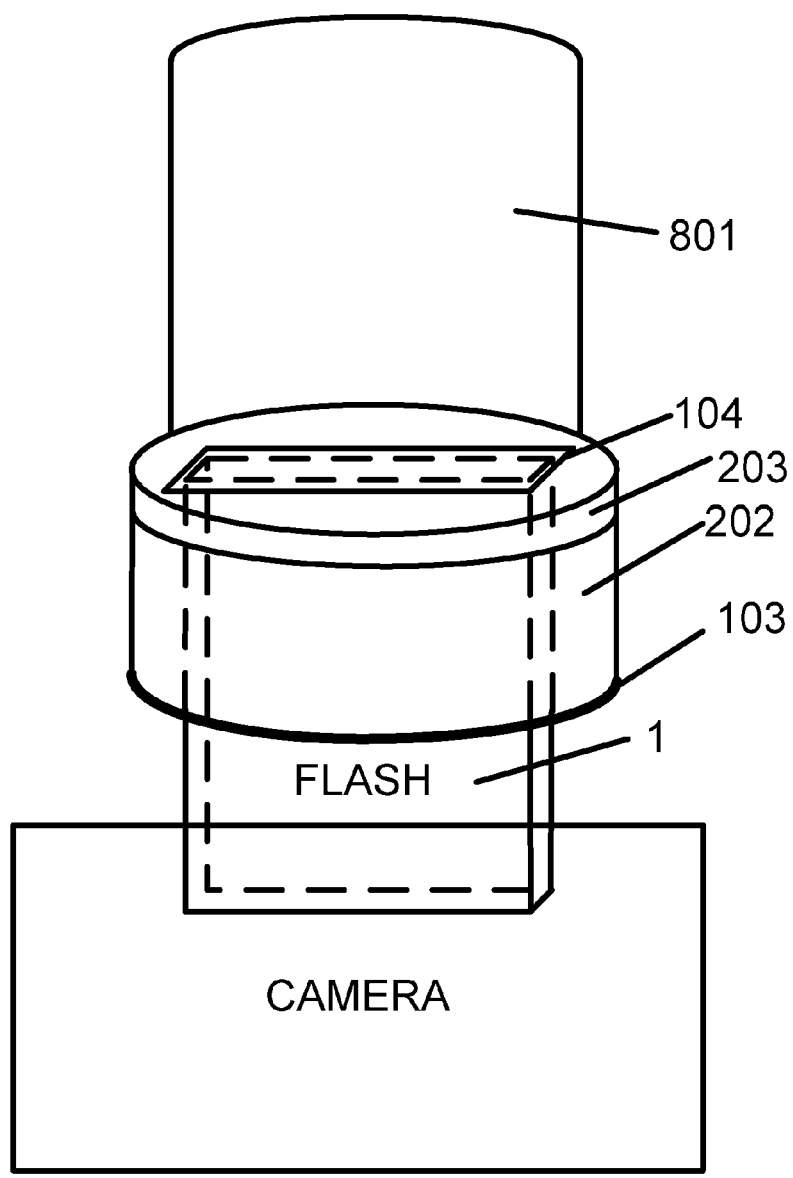
FIG. 8 is a perspective view of the subject invention utilizing a reflector apparatus in accordance with an alternative embodiment of the invention.

Referring next to FIG. 8, ring 102 (or ring 502) is shown with a bounce card or other reflector 801 attached thereto by means of a fastener attached to an outer edge thereof. In FIG. 8, the Velcro® hook and loop attachment mechanism may be employed. Other attachment mechanisms such as those described above may be employed.

Figure 9:
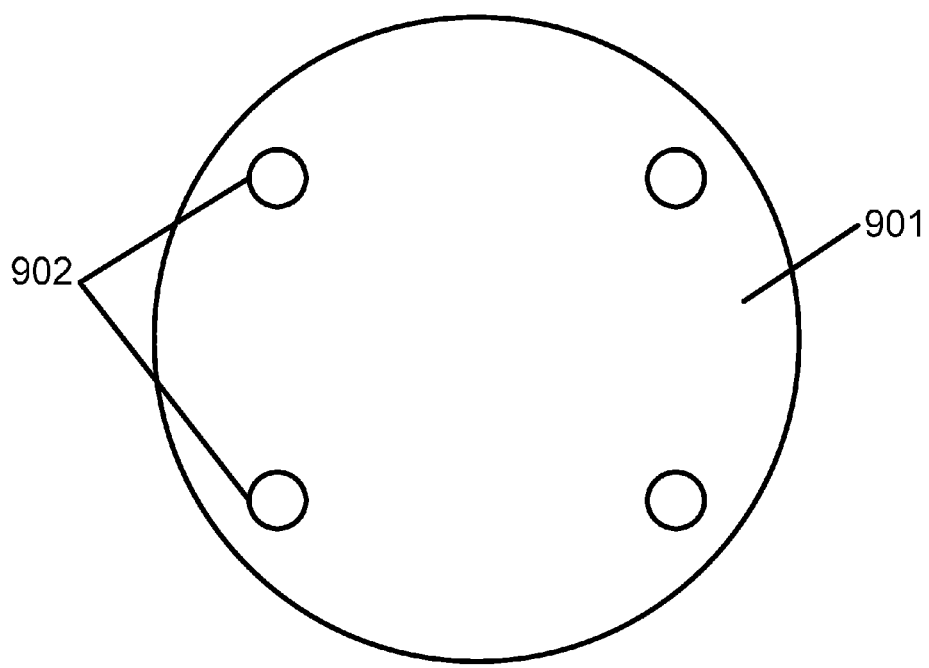
FIG. 9 is a top plan view of a photographic gel which may be used in combination with the subject apparatus in accordance with yet another embodiment of the present invention.
Figure 10:
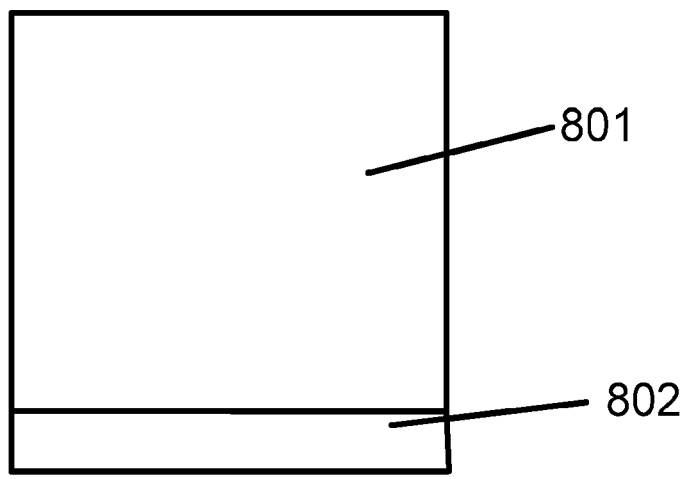
FIG. 10 is a detailed view of a reflector that may be utilized in accordance with an alternative embodiment of the present invention.

According to FIG. 9, a gel 901 or other photographic attachment may be provided attaching to sleeve 101 via one or more attachment mechanisms 902 engaging with attachment mechanisms 102 or the like. FIG. 10 depicts reflector 801, including attachment mechanism 802, shown in FIG. 8, without being attached to ring 102.

In an alternative embodiment of the present invention, a sleeve and ring may be formed of an oval construction. As an oval construction, the ring may be formed of a flexible material so that it can deform as rotated about the sleeve. Other attachments and the like may function similarly to those noted above. Any of the constructions shown in FIGS. 1-10 may be employed with such an oval construction. Furthermore, any of the constructions shown in FIGS. 1-10 may be employed with the basic construction set forth in FIGS. 11 and 12.

The component parts of the subject device may be made from a variety of materials suitable for use in photography applications. Molded thermoplastic resins are generally preferred. These may be the same or similar to molded plastics already used in cameras in flash units and examples may include reinforces styrenes, A.B.S. resins, polyesters or nylon components, in any desired colors. It will be recognized that opaque or translucent plastics or films will be suitable for certain components of the subject design as described in further detail below.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A photographic flash attachment apparatus comprising:
   a sleeve configured to be removably fixed to a photographic flash;
   a ring configured to engage with the sleeve, the ring being rotatably coupled thereto wherein rotation of the ring provides rotation relative to the sleeve and photographic flash while the sleeve is fixed to the photographic flash;
   a plurality of photographic accessories simultaneously removably coupled to the ring, wherein movement of the ring provides a similar relative concentric motion of the plurality of photographic accessories relative to the ring and photographic flash while the sleeve is fixed to the photographic flash and the ring is maintained rotatable relative to the sleeve; and an additional photographic accessory coupled to the sleeve, wherein movement of the ring does not provide rotation of the additional photographic accessory relative to the sleeve and photographic flash while the sleeve is fixed to the photographic flash.

2. The apparatus of claim 1, wherein the photographic accessory comprises a bounce card.

3. The apparatus of claim 2, wherein rotation of the ring repositions the photographic accessory relative to the photographic flash.

4. The apparatus of claim 1, wherein the photographic accessory is a photographic diffuser.

5. The apparatus of claim 4, wherein the photographic diffuser has a dome shape.

6. The apparatus of claim 4, wherein the photographic diffuser defines an aperture therein.

7. The apparatus of claim 1, wherein the photographic accessory is a colored gel element.

8. The apparatus of claim 1, wherein the photographic accessory comprises a conic shape diffuser.

9. The apparatus of claim 1, further comprising a scale for indicating relative positioning of the ring relative to the sleeve.

10. The apparatus of claim 1, further comprising a fastening element for fastening the sleeve to the flash.

11. The apparatus of claim 1, wherein the sleeve and ring are circular.

12. The apparatus of claim 1, wherein the sleeve and ring are oval shaped.

13. The apparatus of claim 12, wherein the ring is formed of a deformable material to conform to the shape of the sleeve when rotated relative thereto.

14. A photographic flash attachment apparatus comprising:

a sleeve configured to be removably fixed to a photographic flash;

a ring configured to engage with the sleeve;

a reflector card and a second photographic attachment attached to the ring;

an additional photographic accessory coupled to the sleeve;

wherein rotation of the ring relative to the sleeve provides rotation of the reflector card and the second photographic attachment relative to the photographic flash and concentric with the ring while the sleeve is fixed to the photographic flash, allowing for the direction of light from the flash in any direction; and wherein rotation of the ring does not provide rotation of the additional photographic accessory relative to the sleeve and photographic flash while the sleeve is fixed to the photographic flash.

* * * * *